(12) United States Patent
Barkai et al.

(10) Patent No.: US 8,736,905 B2
(45) Date of Patent: May 27, 2014

(54) POSITION CALIBRATION OF A SPOT OF AN OPTICAL SENSOR

(75) Inventors: Nadav Barkai, Ramat Gan (IL); Gal Amit, Bat Yam (IL); Lior Katz, Raanana (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 195 days.

(21) Appl. No.: 13/327,357

(22) Filed: Dec. 15, 2011

(65) Prior Publication Data

US 2012/0314232 A1    Dec. 13, 2012

Related U.S. Application Data

(63) Continuation-in-part of application No. PCT/EP2011/059500, filed on Jun. 8, 2011.

(51) Int. Cl.
| | | |
|---|---|---|
| *G06K 1/00* | (2006.01) | |
| *H04N 1/46* | (2006.01) | |
| *G01B 11/14* | (2006.01) | |
| *B41J 2/015* | (2006.01) | |

(52) U.S. Cl.
USPC ............... 358/1.9; 358/504; 356/622; 347/19

(58) Field of Classification Search
USPC .......... 358/1.9, 504; 356/622, 609, 612, 624, 356/4.05, 392–394, 405, 406, 408, 421, 356/425, 444, 218, 219, 229; 399/41, 74; 347/19
See application file for complete search history.

(56) References Cited

U.S. PATENT DOCUMENTS

| | | | |
|---|---|---|---|
| 3,970,393 A | 7/1976 | Krygeris et al. | |
| 4,671,661 A | 6/1987 | Ott | |
| 6,178,007 B1 | 1/2001 | Harrington | |
| 6,351,308 B1 | 2/2002 | Mestha | |
| 6,474,767 B1 | 11/2002 | Teshigawara et al. | |
| 6,873,431 B1 | 3/2005 | Kohler et al. | |
| 7,027,185 B2 | 4/2006 | Subirada et al. | |
| 7,177,558 B2 | 2/2007 | Tanaka et al. | |
| 7,394,540 B2 | 7/2008 | Lekson et al. | |
| 7,477,420 B2* | 1/2009 | Friedman et al. | 358/1.9 |
| 7,537,304 B2 | 5/2009 | Wu et al. | |
| 7,676,166 B2 | 3/2010 | Saida et al. | |
| 7,800,779 B2 | 9/2010 | Fan et al. | |
| 2006/0158472 A1* | 7/2006 | Endo | 347/14 |
| 2007/0291291 A1* | 12/2007 | Vilar et al. | 358/1.9 |
| 2010/0002266 A1 | 1/2010 | Takahashi et al. | |
| 2012/0120143 A1* | 5/2012 | Amit et al. | 347/19 |

FOREIGN PATENT DOCUMENTS

EP        1006712 A1    6/2000

* cited by examiner

*Primary Examiner* — Barbara Reinier

(57) ABSTRACT

A method for position calibration of a spot of an optical sensor may include providing a position calibration patch on a sheet at a predetermined position, along a scan path of the spot across the sheet, the patch comprising at least two adjacent blocks of different colors. The method may also include obtaining a single sample of the position calibration patch using the optical sensor. The method may further include determining from the single sample the position of the spot of the sensor with respect to the position calibration patch.

21 Claims, 5 Drawing Sheets

POSITION CALIBRATION OF A SPOT OF AN OPTICAL SENSOR

CROSS REFERENCE TO RELATED APPLICATIONS

This application is a Continuation-In-Part application of PCT International Application No. PCT/EP2011/059500, filed Jun. 8, 2011, designating the US, which is hereby incorporated by reference.

BACKGROUND

Today, most digital presses rely on an optical sensor for calibrating colors, and since different types of sensors measure different types of data, the type of the optical sensor is usually linked to the method of the color calibration.

There are two commonly used methods for measuring, and hence calibrating, color; the first method measures optical density (OD) values of a printed area and the second method measures a full spectral response of a printed area and therefore its CIE 1976 (L*, a*, b*) color space (also called CIELAB, whose coordinates are L*, a*, and b*) colorimetric coordinates.

Obtaining accurate color measurements typically depends on the precise positioning of the sensor over the printed area. Inaccurate positioning may result in the sensor not accurately measuring a consistent patch and may therefore lead to inaccurate or inconsistent measurements. The accuracy requirements increase as the printed patches decrease in size. Since the press set-up state may degrade over time as consumables age and other process variables change, the resulting color may also alter over time.

BRIEF DESCRIPTION OF THE DRAWINGS

Reference is made to the accompanying drawings, in which.

Figure 1:
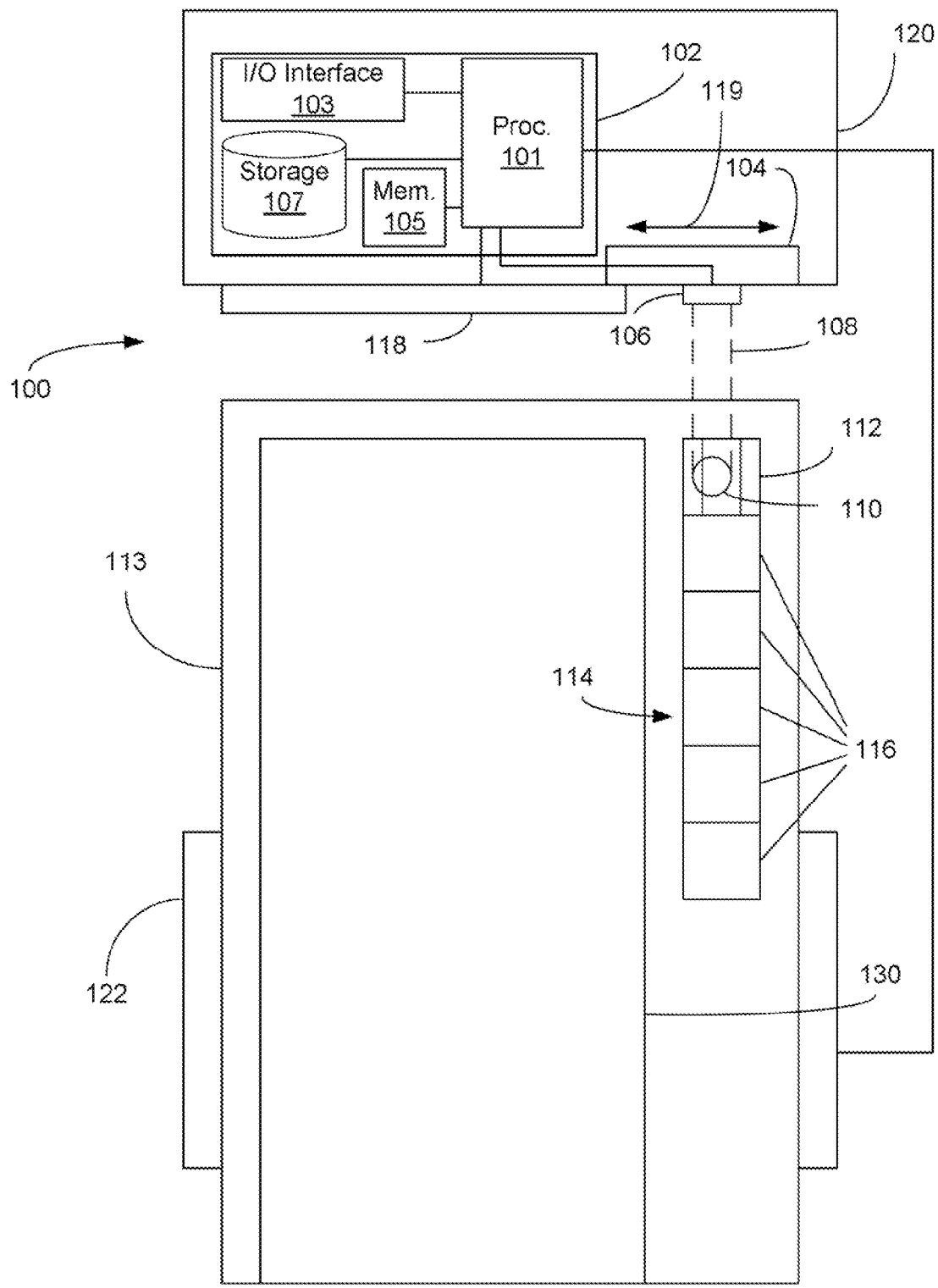
FIG. 1 illustrates a system for determining a position of a spot of an optical sensor with respect to a position calibration patch on a print, according to one example.

Reference numerals may be repeated among the drawings to indicate corresponding or analogous elements. Moreover, some of the blocks depicted in the drawings may be combined into a single function.

DETAILED DESCRIPTION

A system and method for determining a position of a spot of an optical sensor with respect to a known position on a print (e.g. a print for continuous color calibration) according to one example is disclosed herein. Such system and method may facilitate precise sensor placement so as to maintain the sensor's field of view (also referred to as the spot of the sensor) within desired confines. A single position calibration patch may be used, thus allowing self position calibration to be performed on virtually any printed sheet (or on any predefined number of printed sheets).

FIG. 1 illustrates a system 100 for determining a position of an optical sensor with respect to a known position on a print for continuous color calibration.

Sheet 113 is presented in a facing orientation so as to present the features present on that sheet, while printer 120 is shown in a side view, but it is to be understood that optical sensor 106 is designed to scan across sheet 113 along scanning path 108 as sheet 113 (or printer 120) moves in the direction of scan.

System 100 may include printer 120, with printing assembly 118 (such as, for example one or multiple printing heads or a print drum) which are configured to print on sheet 113.

Sheet 113 may be, for example, a sheet fed from a tray carrying a stack of one or more sheets, a continuous sheet (also known as "web"), of any appropriate size, suitable for printing by printer 120.

Printing assembly 118 may typically be configured to print anywhere on sheet 113. Specifically, printing assembly 118 may be designed to print text, graphics or any printable items within designated printing area 130, as well as on any other areas on sheet 113.

Color calibration strip 114 may be provided on sheet 113, typically printed by printer 120 (but this is not a requirement, as it may be printed on sheet 113 by another printer or otherwise provided on sheet 113, and not necessarily by printer 120). Typically color strip 114 may include blocks 116 (also referred to as "patches") of different colors, which are used for color calibration or the like and are typically supposed to be sampled by optical sensor 106, such as, for example, a densitometer sensor (consider, as an example, densitometer model DTP24, marketed by X-Rite Inc., Grand Rapids, Mich., USA).

A densitometer is a device that measures the degree of darkness (also termed as "optical density") of a transparent (or semi transparent) or a reflecting surface. Densitometers are commonly used for color calibration. The aim of color calibration is to measure or adjust the color response of an input or output device (e.g. a printer) to establish a known relationship to a standard color space (e.g. CIELAB, CMYK, RGB).

Optical sensor 106 may be coupled to displacing member 104 (e.g. an electrical motor that is configured to engage with optical sensor 106 via a transmission gear), designed to move optical sensor 106 and position it at any desired position along axis 119, which is substantially perpendicular to scan path 108.

Position calibration patch 112 may be provided on sheet 113 at a known position with respect to a reference position. The reference position may be, for example, the position of color calibration strip 114, the position of a feature of color calibration strip 114 (e.g. the position of any of its color patches 116), or any other reference position.

Typically it is desired to have spot 110 of optical sensor 106 coincide with the color calibration strip, so as to allow effective sampling of the color patches of the strip. Thus, position calibration patch 112 may be positioned on sheet 113 anywhere along the scanning path 108. For example, position calibration patch 112 may be position in front color calibration strip 114, behind at any other position along it, as well as separately from color calibration strip 114.

In another example, position calibration patch 112 may be positioned away from scan path 108 at a known position with respect to a reference position, but that would require that optical sensor 106 be provided with a displacing arrangement so as to allow its displacement with respect to sheet 113 (e.g. by displacing member 104) or that sheet 113 be provided with a displacing arrangement so as to allow its displacement with respect to sensor 106 (e.g. by moving feed tray 122 perpendicularly with respect to the scanning direction).

Printer 120 may include controller 102, which may include processor 101 for executing programs or process data, e.g. programs for executing a method for position calibration of the spot of a sensor, such as described herein and other such methods. The controller 102 may also include memory 105 for short term use, non-transitory storage device 107 for long-term storage of executable programs and data, and input/output (I/O) interface 103 for interfacing printer 120 with other input or output devices.

Figure 2:
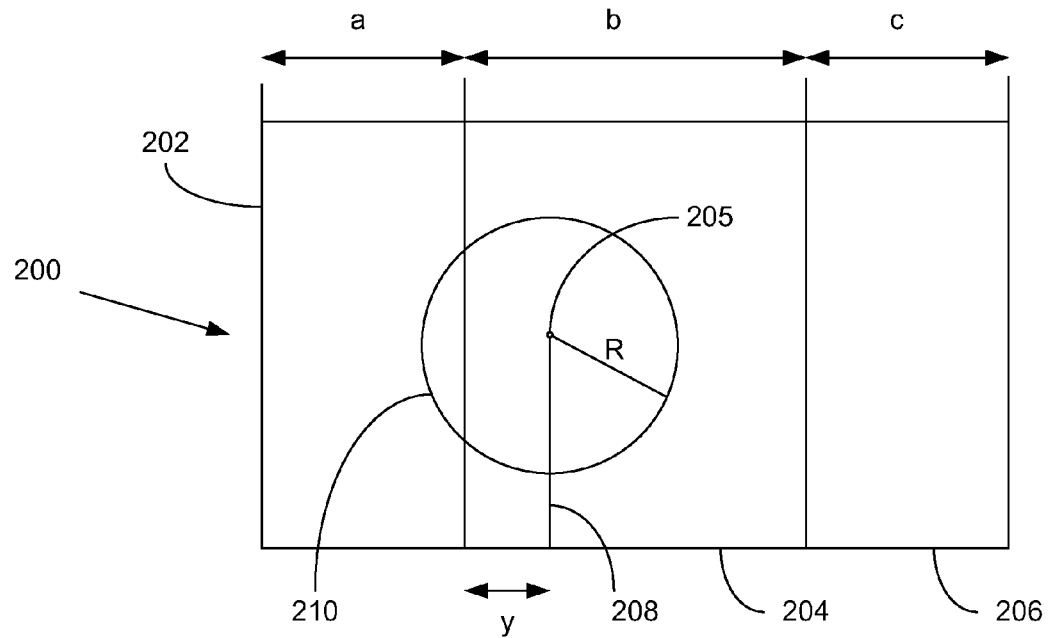
FIG. 2 illustrates a position calibration patch, according to an example.

Reference is now made to FIG. 2 illustrating a position calibration patch according to an example.

Position calibration patch 200 may include two or more adjacent blocks (e.g. where each two adjacent blocks have a common edge) of different colors. In the example shown in FIG. 2, position calibration patch 200 includes three adjacent color blocks: a first side color block 202 located at a first lateral side of the position calibration patch, a second side color block 206 located at a second lateral side of the position calibration patch and a third intermediary color block 204 located between first side color block 202 and second side color block 206.

The lateral width (i.e. perpendicular to scanning path 108, shown in FIG. 1) of any or all of the color blocks of position calibration patch 200 may be selected so as to predetermine all possible coverage possibilities of the color blocks by spot 210 of the optical sensor (106, FIG. 1). The center of the spot is denoted by 205. For example, width b of intermediary color block 204 may be selected to be slightly greater than the lateral width of spot 210 (which, in the case of a circle, is twice radius R), so that at any time spot 210 covers an area that is confined within intermediary color block or covers an area which includes a portion of intermediary color block 204 and either of the side color blocks (202, 206), but not both. This way a maximal signal is obtained when the sensor is perfectly centered over the intermediary color block, avoiding nonlinear edge effects. The lateral widths a and c of side color blocks 202 and 206 (respectively) may be, in this example, of any size (i.e., smaller or greater than lateral width b).

Position calibration patch 200 may present blocks of different colors. The different colors may comprise the primary colors of a selected color space (e.g. Cyan, Magenta, Yellow and Black for the CMYK color space). Although other different colors may be used, it may be advantageous to select primary colors, so as to allow the optical sensor to clearly distinct them.

In some examples a position calibration patch may include just two color blocks.

In other examples a position calibration patch may include two color blocks provided on the sheet, while the background color of the sheet serves as a third color block.

Figure 3:
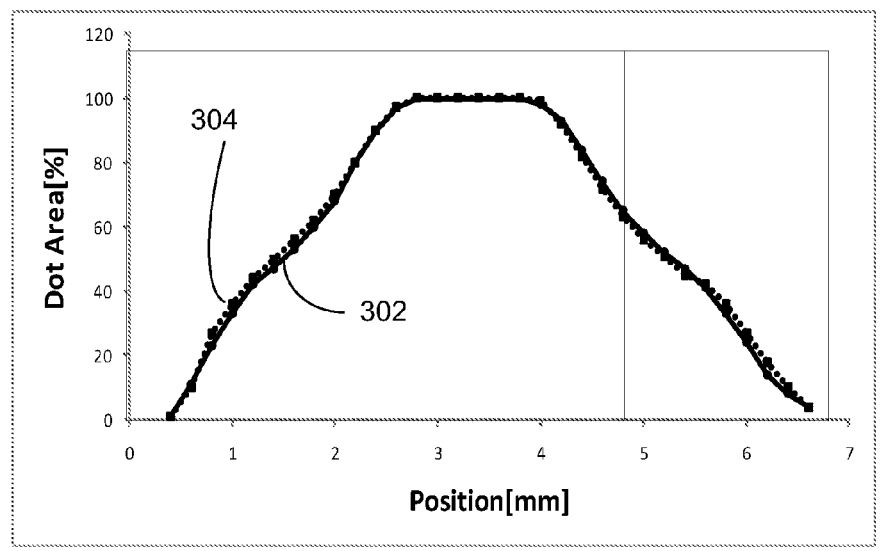
FIG. 3 is a line chart of optical density values sampled by an optical sensor vs. position of the sensor with respect to a position calibration patch, according to an example.

FIG. 3 is a line chart of optical density values sampled by an optical sensor vs. position of the sensor with respect to a position calibration patch, according to an example. Shown are normal (continuous line 302) optical density readings and high optical density readings (dashed line 304), indicating the relative coverage of magenta in the position calibration patch of FIG. 2 (in percentage) with respect to the position of the optical sensor (in mm). "Normal" optical density (OD) refers to an OD value which is set to the ink OD set-point value. This value is typically fixed and predetermined according to the ink properties and the gloss level of the substrate on which it is printed on. "High" OD refers an OD value which is higher than the specific ink's OD set-point.

The "position" refers to the position of the center of the sensor spot (205, see FIG. 2).

In order to test the accuracy of a position calibration method, the position calibration patch was printed and sampled twice using two different OD values, "Normal OD" which is the regular set point for each solid and "High OD" which is higher than the solids OD regular set points. These tests were conducted on an offline robot. As shown in FIG. 3, the output is a function that maps the sensor's position with respect to the relative coverage of Magenta by the sensor's spot. Using this function, it may be possible to determine the position of the sensor (actually the spot of the sensor). In some examples, the sensor may be moved so as to obtain a desired position accordingly.

It is evident from the chart that the OD readings are not the same for same relative coverage of magenta and cyan compared with the same relative coverage of magenta and yellow. The reason for this specific configuration of the colors lies in their absorption spectrum. Magenta absorbs light in the central region of the visible wavelength whereas Yellow and Cyan absorb light in the shorter and longer wavelength regions, respectively. Thus it is possible to distinguish a state where the spot covers magenta and yellow from a state where the spot covers magenta and cyan, even when the same relative coverage of magenta is maintained. This way, only two colors participate in the sampling process at a time.

A method or system for position calibration is based on calculating the Magenta and Cyan (or Yellow) coverage within the measured area of the sensor's spot. Knowing the relative coverage (i.e. Magenta coverage with respect to the spot containing the two participating colors allow a rather accurate determination of the sensor's spot position over the patch and therefore, over an entire color calibration strip aligned with the position calibration patch.

Methods and systems for position calibration make use of the minimal overlapping of the absorption wavelengths of the three optical density response filters.

Specifically, the relation between the dot area (DA), which is the relative area inside the sensor's spot (its measurements aperture) occupied by magenta and the optical density sampled by the optical sensor, according to the Murray Davis model, is given by:

$$DA = \frac{10^{-OD_{cyan/yellow}} - 10^{-OD_{sample}}}{10^{-OD_{cyan/yellow}} - 10^{-OD_{magenta}}} \quad (1)$$

where $OD_{cyan/yellow}$ is the optical density of cyan or yellow, $OD_{magenta}$ is the optical density of magenta, and $OD_{sample}$ is the optical density of the sampled position calibration patch. In this above equation all OD values were taken from the Magenta response filter only.

Thus, it is possible to determine from the sampled position calibration patch the relative coverage of the spot of the sensor over the color blocks of the position calibration patch.

Next, based on the known geometry of the spot and on the determined relative coverage, the position of the optical sensor with respect to the reference position may be determined. The term "known geometry" is understood, in the context of the present application, to include the shape and dimensions of the spot.

This may be demonstrated by considering the position calibration patch shown in FIG. 2, and the optical sensor spot that has in that case a circular shape. For this set up, the following relation may be used, defining the relation between DA, radius R of the spot and distance y, which is, in this example, the distance between the border line between magenta and cyan (that may serve as a reference position) and the center of the circular spot:

$$DA = 0.5 - \frac{1}{\pi} \cdot \sin^{-1}\left(\frac{y}{R}\right) - \left[\frac{R}{\pi} \cdot \sqrt{1 - \left(\frac{y}{\pi}\right)^2}\right] \quad (2)$$

Note that equation (2) corresponds to a circular spot having radius R and to a position calibration patch with color blocks that share a linear border line. A spot and/or position calibration patch of other geometric properties may require the use of another equation defining the proper relation between the position of the spot (i.e. the position of the optical sensor) and DA.

Figure 4:
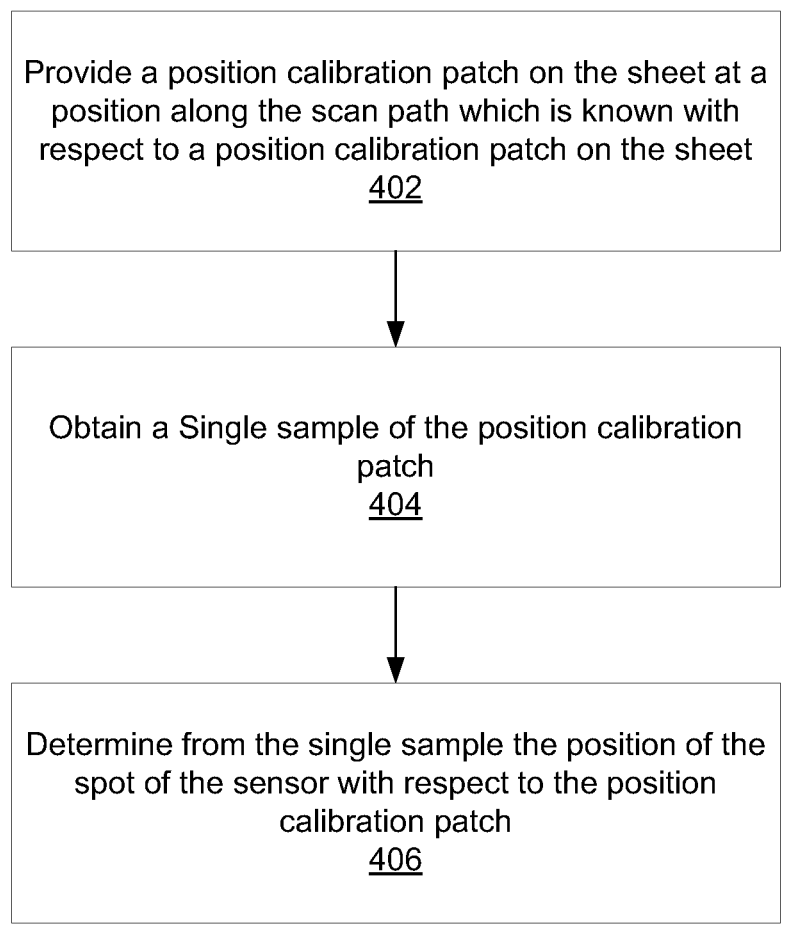
FIG. 4 illustrates a method for position calibration of a spot of an optical sensor with respect to a known position on a print, according to an example.

FIG. 4 illustrates a method 400, according to one example, for determining a position of a spot of an optical sensor traveling along a scan path across a sheet, with respect to a reference position on the sheet. By "traveling" it is meant to refer to a situation where the sensor is stationary and the sheet is traveling, a situation where the sheet is stationary and the sensor is traveling and a situation where both the sheet and the sensor are traveling, all which create a relative motion between the sensor (or the spot of the sensor) and the sheet, effectively causing the spot to travel along the scan path across the sheet.

Method 400 may include providing 402 a position calibration patch on the sheet at a position along the scan path which is known with respect to the reference position, the patch comprising at least two blocks of different colors. The method may also include obtaining 404 a single sample of the position calibration patch using the optical sensor; and determining 406 from the single sample the position of the spot of the sensor with respect to the position calibration patch.

Figure 5:
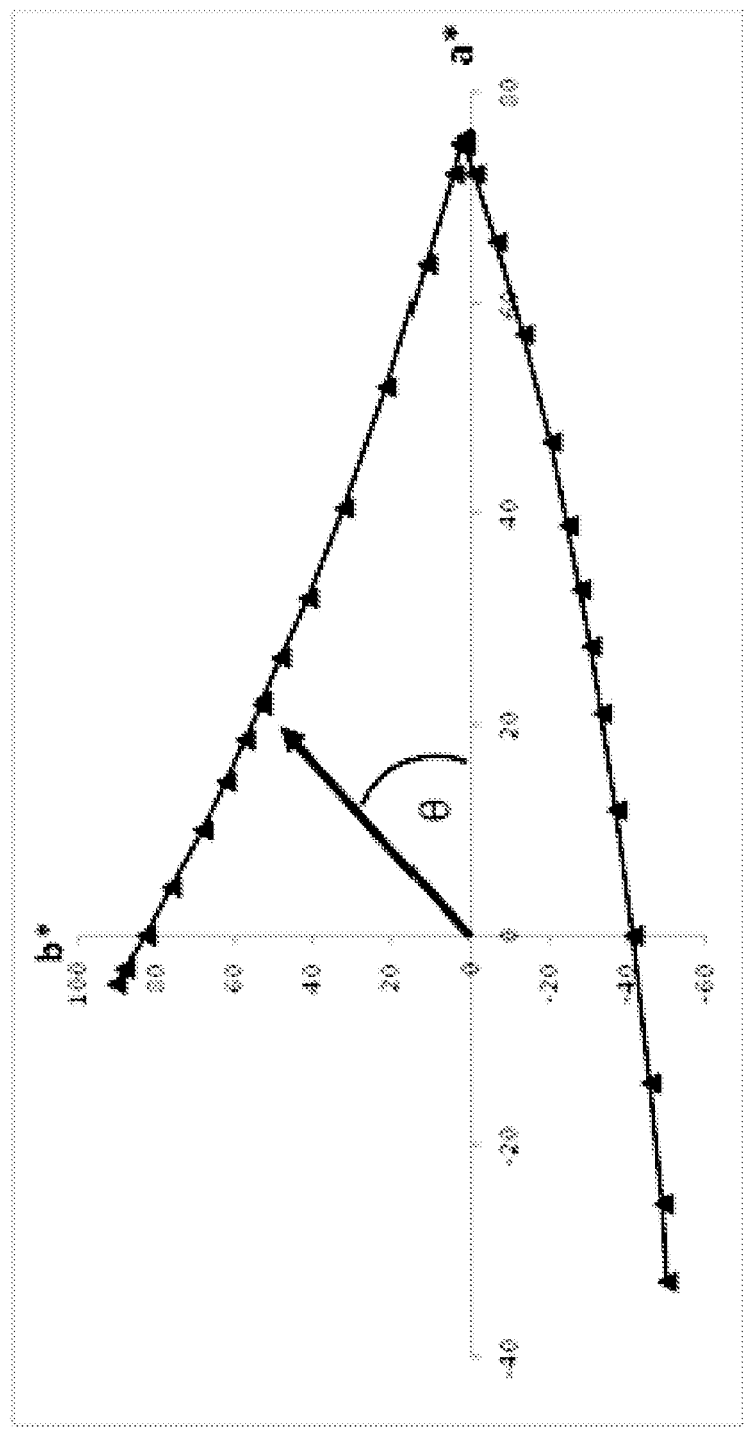
FIG. 5 illustrates a plot of CIELAB calibration measurement results obtained by a spectrophotometer with respect to different positions of the spectrophotometer relative to the calibration patch, according to an example.

FIG. 5 illustrates a plot of CIELAB calibration measurement results obtained by a spectrophotometer with respect to different positions of the spectrophotometer relative to the calibration patch, according to an example. "Calibration measurement results" refer to a calibration process in which the calibration patch is sampled in by the spectrophotometer to obtain a series of samples from known positions across the patch. These measurement results are used to construct a look-up table as explained hereinafter. This "calibration" is not to be mistaken with the color calibration for which the spectrophotometer is used, for example, in the set-up as described in FIG. 1.

The plot of FIG. 5 includes a series of calibration measurement results obtained by sampling the calibration patch shown in FIG. 2 using a spectrophotometer that sampled the patch at varying positions across the patch, the results shown in the a*-b* plane. Along the a* axis, negative values indicate green while positive values indicate magenta and along the b* axis, negative values indicate blue and positive values indicate yellow. Each measurement is distinctly associated with polar angle θ.

Every color combination which is covered by the circular measurement aperture (the spot) yields a different color and hence different CIELAB values. The CIELAB values obtained in the calibration process (FIG. 5) they may be used to construct a lookup table (see FIG. 6) that links the polar angle on the a*-b* plane and the sensor's position.

Figure 6:
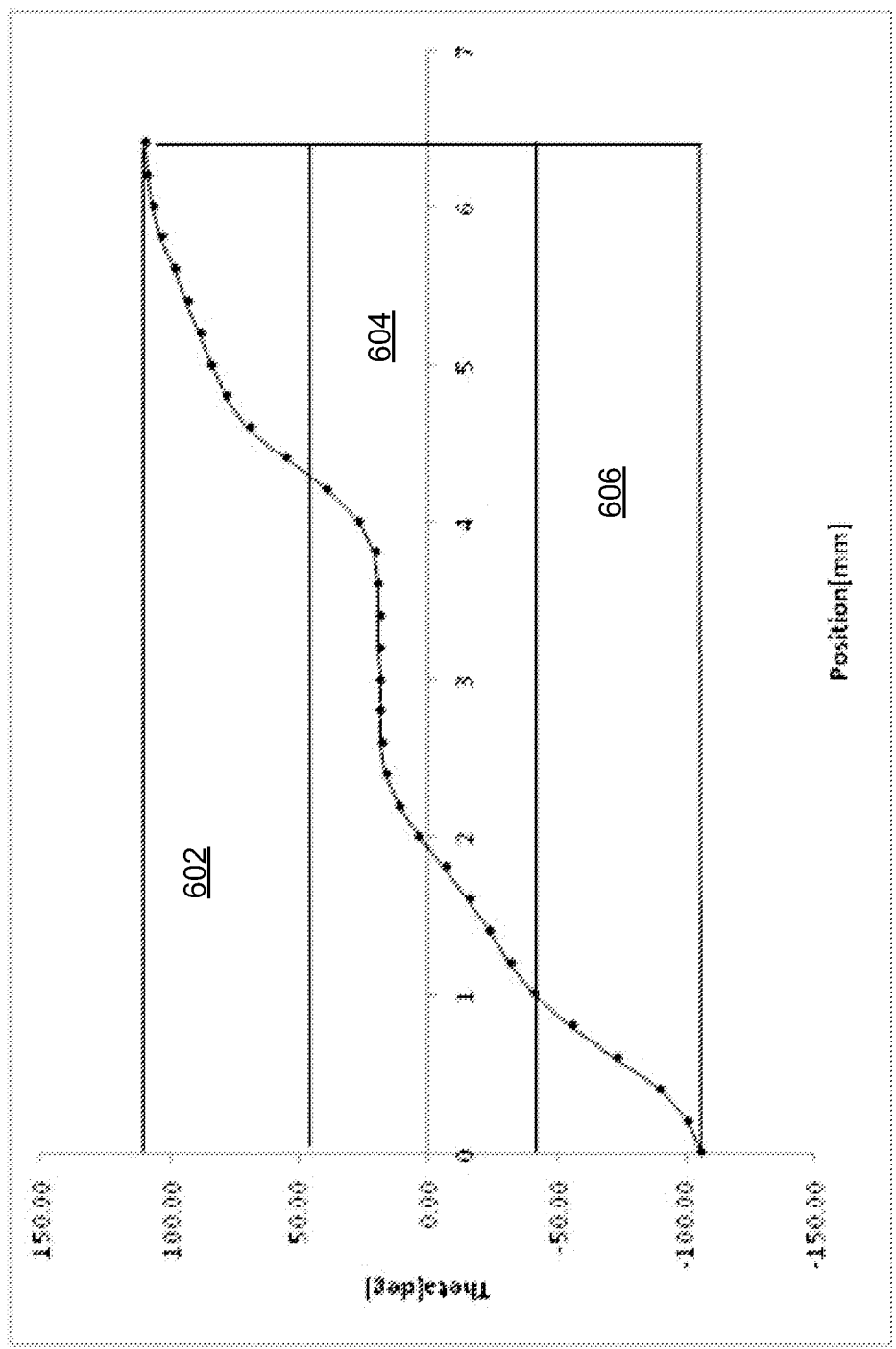
FIG. 6 is a line chart showing the relation between the polar angle θ (see FIG. 5) and the position of the sensor with respect to a position calibration patch, according to an example.

The sensor's location is corrected according to the lookup table where its motion resolution is determined by the mechanical system capabilities FIG. 6 is a line chart showing the relation between the polar angle θ and the position of the sensor with respect to a position calibration patch. The chart depicted in FIG. 6 can be used as a look-up table which links the CIELAB sample value obtained by the spectrophotometer (which may be presented in terms of polar angle θ) and the position of the spot over the calibration patch.

A method for determining the position of a spot of an optical sensor with respect to the reference position on the sheet may be used to continuously self-calibrate the cross-process position of an in-line optical sensor (e.g. densitometer, spectrophotometer) in the output print path of a high speed digital press. For example, a position calibration patch may be provided periodically along the scan path of the optical sensor. In some examples a position calibration patch may be provided in front or within each color calibration strip of a plurality of color calibration strips provided on a sheet, when the existence of a plurality of jobs requires the use of a plurality of color calibration strips.

A method and system for position calibration may rely solely on the sampled optical density values, and is based on the analysis of the optical properties of the position calibration patch and the geometrical properties of the sensor's spot. Such method or system is general enough to be embedded into or integrated with practically any printing device.

Simple sampling, as described hereinabove, facilitates performing position calibration for the sensor's spot continuously for each printed sheet, thus allowing color calibration patches to share the same spread with the position self-calibration pattern.

A method and system for determining a position of a spot of an optical sensor traveling along a scan path across a sheet, with respect to a reference position on the sheet, do not require the use of additional optical devices such as camera, scanner or a barcode reader, rendering such method and system less expensive than methods and systems that use additional optical devices.

A method and system for determining a position of a spot of an optical sensor traveling along a scan path across a sheet seem also superior to another known solution for determining the position of the leading edge of the sheet, which involves using a low cost tracking sensor configured to track the leading edge only, which is prone to mis-registration due to misalignment between the sheet and the printed image on it.

Employing a method (or system) for position calibration of the spot of the sensor may yield some advantages, among which are:

1. Use of only a single position calibration patch allows continuously determining the position of the spot of the sensor for every printed sheet and thus facilitates online calibration of the position of the sensor.

2. Calibration methods for determining a position of a spot of an optical sensor traveling along a scan path across a sheet may involve little, if any hardware adjustment in existing printers, since they may be applied as algorithmic solutions embedded in machines with existing sensors.

3. A position calibration patch may be printed alongside the regular (customer's) printed job, so that it does not interrupt the regular run of that job.

Aspects of the invention may be embodied in the form of a system, a method, or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with examples of the present invention. In some examples of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to examples of the invention.

What is claimed is:

1. A method for position calibration of a spot of an optical sensor, the method comprising:
   obtaining a sample of a single position calibration patch on a sheet at a predetermined position, along a scan path of the spot across the sheet, the patch comprising at least two adjacent blocks of different colors using the optical sensor; and
   determining from the sample the position of the spot of the optical sensor with respect to the position calibration patch.

2. The method of claim 1, wherein the position calibration patch comprises three adjacent blocks of different colors.

3. The method of claim 2, wherein the three adjacent blocks of different colors comprise a first side color block located at a first lateral side of the position calibration patch, a second side color block located at a second lateral side of the position calibration patch and a third intermediary color block located between the first side color block and the second side color block, wherein a lateral width of the spot of the sensor is smaller than a lateral width of the intermediary color block.

4. The method of claim 3,
   wherein the three adjacent blocks of different colors comprise a block of cyan, a block of magenta and a block of yellow, in that order,
   wherein the optical sensor is a densitometer;
   wherein the spot is circular; and
   wherein the step of determining from the sample the position of the spot with respect to the position calibration patch comprises using the following relations:

$$DA = \frac{10^{-OD_{cyan/yellow}} - 10^{-OD_{sample}}}{10^{-OD_{cyan/yellow}} - 10^{-OD_{magenta}}},$$

where DA is the relative area of the spot covering magenta, $OD_{cyan/yellow}$ is the optical density of cyan or yellow, $OD_{magenta}$ is the optical density of magenta, and $OD_{sample}$ is the optical density of the sample, and $$DA = 0.5 - \frac{1}{\pi} \cdot \sin^{-1}\left(\frac{y}{R}\right) - \left[\frac{R}{\pi} \cdot \sqrt{1 - \left(\frac{y}{\pi}\right)^2}\right],$$

when R is the radius of the spot and y is the distance between a border between the block of said one of the different colors and an adjacent block color and the center of the spot.

5. The method of claim 1 wherein the different colors are primary colors of a color space.

6. The method of claim 1, wherein the optical sensor is a spectrophotometer, and wherein determining from the sample of the position of the spot with respect to the position calibration patch comprises determining the position of the spot based on a CIELAB value of the sample.

7. The method of claim 6, wherein the position of the spot is determined by referring to a look-up table that defines a relation between a polar angle θ defining a position of the CIELAB value of the sample in a*-b* plane and positions of the spot with respect to the position calibration patch.

8. The method of claim 1, wherein the position calibration patch is aligned with a color calibration strip.

9. A non-transitory computer readable medium containing instructions for position calibration of a spot of a known geometry of an optical sensor, that when executed cause a processor to execute the steps of:
   obtaining a sample of a single position calibration patch that is located on a sheet at a predetermined position, along a scan path of the spot across the sheet, the patch comprising at least two adjacent blocks of different colors using the optical sensor;
   determining from the sample the position of the spot of the optical sensor with respect to the position calibration patch; and
   instructing a displacing member to adjust the alignment of the optical sensor based on the determined position of the optical sensor.

10. The non-transitory computer readable medium of claim 9, wherein the position calibration patch comprises three adjacent blocks of different colors.

11. The non-transitory computer readable medium of claim 10, wherein the three adjacent blocks of different colors comprise a first side color block located at a first lateral side of the position calibration patch, a second side color block located at a second lateral side of the position calibration patch and a third intermediary color block located between the first side color block and the second side color block, wherein a lateral width of the spot of the sensor is smaller than a lateral width of the intemiediary color block.

12. The non-transitory computer readable medium of claim 11,
   wherein the three adjacent blocks of different colors comprise a block of cyan, a block of magenta and a block of yellow, in that order,
   wherein the optical sensor is a densitometer;
   wherein the spot is circular; and
   wherein the step of determining from the sample the position of the spot with respect to the position calibration patch comprises using the following relations:

$$DA = \frac{10^{-OD_{cyan/yellow}} - 10^{-OD_{sample}}}{10^{-OD_{cyan/yellow}} - 10^{-OD_{magenta}}},$$

where DA is the relative area of the spot covering magenta, $OD_{cyan/yellow}$ is the optical density of cyan or yellow, $OD_{magenta}$ is the optical density of magenta, and $OD_{sample}$, is the optical density of the sample, and $$DA = 0.5 - \frac{1}{\pi} \cdot \sin^{-1}\left(\frac{y}{R}\right) - \left[\frac{R}{\pi} \cdot \sqrt{1 - \left(\frac{y}{\pi}\right)^2}\right],$$

where R is the radius of the spot and y is the distance between a border between the block of said one of the different colors and an adjacent block color and the center of the spot.

13. The non-transitory computer readable medium of claim 9, wherein the different colors are primary colors of a color space.

14. The non-transitory computer readable medium of claim 9, wherein the optical sensor is a spectrophotometer, and wherein determining from the sample of the position of the spot with respect to the position calibration patch comprises determining the position of the spot based on a CIELAB value of the sample.

15. The non-transitory computer readable medium of claim 14, wherein the position of the spot is determined by referring to a look-up table that defines a relation between a polar angle θ defining a position of the CIELAB value of the sample in a*-b* plane and positions of the spot with respect to the position calibration patch.

16. A printer with a system for position calibration of a spot of a known geometry of an optical sensor, the system comprising:
a processing unit in communication with a computer readable medium, wherein the computer readable medium contains a set of instructions wherein the processing unit is designed to carry out the set of instructions to:
obtain a sample of a position calibration patch that is located on a sheet at a predetermined position, along a scan path of the spot across the sheet, the patch comprising at least two adjacent blocks of different colors using the optical sensor;
determine from the sample the position of the spot of the sensor with respect to the position calibration patch; and
calibrate the position of the optical sensor online.

17. The printer of claim 16, wherein the position calibration patch comprises three adjacent blocks of different colors that include a first side color block located at a first lateral side of the position calibration patch, a second side color block located at a second lateral side of the position calibration patch and a third intermediary color block located between the first side color block and the second side color block, wherein a lateral width of the spot of the sensor is smaller than a lateral width of the intermediary color block.

18. The printer of claim 17,
wherein the three adjacent blocks of different colors comprise a block of cyan, a block of magenta and a block of yellow, in that order,
wherein the optical sensor is a densitometer;
wherein the spot is circular; and wherein determining from the sample of the position of the spot with respect to the position calibration patch comprises using the following relations:

$$DA = \frac{10^{-OD_{cyan/yellow}} - 10^{-OD_{sample}}}{10^{-OD_{cyan/yellow}} - 10^{-OD_{magenta}}},$$

where DA is the relative area of the spot covering magenta, $OD_{cyan/yellow}$ is the optical density of cyan or yellow, $OD_{magenta}$ is the optical density of magenta, and $OD_{sample}$ is the optical density of the sample, and $$DA = 0.5 - \frac{1}{\pi} \cdot \sin^{-1}\left(\frac{y}{R}\right) - \left[\frac{R}{\pi} \cdot \sqrt{1-\left(\frac{y}{\pi}\right)^2}\right],$$

where R is the radius of the spot and y is the distance between a border between the block of said one of the different colors and an adjacent block color and the center of the spot.

19. The printer of claim 16, wherein the optical sensor is a spectrophotometer, and wherein determining from the sample of the position of the spot with respect to the position calibration patch comprises determining the position of the spot based on a CIELAB value of the sample.

20. The printer of claim 19, wherein the position of the spot is determined by referring to a look-up table that defines a relation between a polar angle θ defining a position of the CIELAB value of the sample in a*-b* plane and positions of the spot with respect to the position calibration patch.

21. The method of claim 1, in which wherein determining from the sample the position of the spot of the optical sensor with respect to the position calibration patch comprises using the following relations:

$$DA = \frac{10^{-OD_{color2}} - 10^{-OD_{sample}}}{10^{-OD_{color2}} - 10^{-OD_{color1}}},$$

where DA is the relative area of the field of view covering as first color, $OD_{color2}$ is the optical density of a second color, $OD_{color1}$ is the optical density of a first color, and $OD_{sample}$, is the optical density of the sample.

* * * * *

UNITED STATES PATENT AND TRADEMARK OFFICE
CERTIFICATE OF CORRECTION

PATENT NO. : 8,736,905 B2  Page 1 of 1
APPLICATION NO. : 13/327357
DATED : May 27, 2014
INVENTOR(S) : Nadav Barkai et al.

It is certified that error appears in the above-identified patent and that said Letters Patent is hereby corrected as shown below:

In the claims

In column 7, line 63, in Claim 4, delete "when" and insert -- where --, therefor.

In column 7, line 66, in Claim 5, delete "1" and insert -- 1, --, therefor.

In column 8, line 39, in Claim 11, delete "intemiediary" and insert -- intermediary --, therefor.

In column 8, line 57, in Claim 12, delete "$OD_{sample}$," and insert -- $OD_{sample}$ --, therefor.

In column 10, line 42, in Claim 21, delete "covering as" and insert -- covering a --, therefor.

In column 10, line 44, in Claim 21, delete "$OD_{sample}$," and insert -- $OD_{sample}$ --, therefor.

Signed and Sealed this
Twenty-fourth Day of May, 2016

Michelle K. Lee
*Director of the United States Patent and Trademark Office*